(12) United States Patent
Portier et al.

(10) Patent No.: US 7,744,788 B2
(45) Date of Patent: Jun. 29, 2010

(54) PROCESS AND APPARATUS FOR COMPOUNDING AND INJECTION-MOULDING DESICCANT-FILLED POLYMERS

(75) Inventors: Benoit Portier, Bourges (FR); Valere Logel, Levallois Perret (FR)

(73) Assignee: Airsec S.A.S., Choisy le Roi (FR)

( * ) Notice: Subject to any disclaimer, the term of this patent is extended or adjusted under 35 U.S.C. 154(b) by 141 days.

(21) Appl. No.: 12/046,499

(22) Filed: Mar. 12, 2008

(65) Prior Publication Data

US 2008/0224341 A1 Sep. 18, 2008

(30) Foreign Application Priority Data

Mar. 12, 2007 (EP) .................. 07005075

(51) Int. Cl.
*B29C 45/76* (2006.01)
(52) U.S. Cl. ................. 264/40.1; 264/328.18; 425/145; 425/169
(58) Field of Classification Search ............... 264/40.1, 264/328.17, 328.18; 425/145, 146, 169
See application file for complete search history.

(56) References Cited

U.S. PATENT DOCUMENTS

| | | | |
|---|---|---|---|
| 3,559,464 A * | 2/1971 | Foust | ................ 73/54.06 |
| 6,071,462 A | 6/2000 | Putsch | |
| 6,854,968 B2 | 2/2005 | Zimmet | |
| 7,090,481 B2 | 8/2006 | Seta | |
| 2007/0235907 A1 * | 10/2007 | Christel | ............... 264/537 |

FOREIGN PATENT DOCUMENTS

| | | | |
|---|---|---|---|
| FR | 2621525 | * | 4/1989 |
| WO | 96/33108 | * | 10/1996 |
| WO | 2005/053931 | * | 6/2005 |

* cited by examiner

*Primary Examiner*—Jill L Heitbrink
(74) *Attorney, Agent, or Firm*—Scott R. Cox

(57) ABSTRACT

Disclosed is an injection moulding machine, comprising an extruder for continuously producing a melt of a desiccant-filled polymer; at least one injection device fluidly connected with the extruder by a first conduit to receive melt and including an injection ram movable to a forward position for injection of melt into an injection mould and a rear position for introduction of melt into the injection device; characterized in that the injection moulding machine further comprises a sensor which allows determination of the viscosity or melt flow index of the desiccant-filled polymer. Further disclosed is a method of operating such a compounder-type injection moulding machine.

11 Claims, No Drawings

PROCESS AND APPARATUS FOR COMPOUNDING AND INJECTION-MOULDING DESICCANT-FILLED POLYMERS

The present invention relates, in general, to a process and apparatus for compounding and injection-moulding adsorbent-filled polymers. Also, the invention relates to an IMC-type compounder equipped with a sensor which allows determination of the viscosity or melt-flow index of the desiccant-filled polymer melt.

Numerous compounders and injection-moulding machines are known in the art, including compounder-type injection moulding machines for mixing and then injecting materials into an injection mould. For example, DE 11 42 229 or WO92/00838 A describe such machines.

It is also known from US2003/0075821 A1 to include in a compounder-type injection moulding machine having an extruder for continuously producing a melt a pressure sensor to ascertain a melt pressure state downstream of an outlet of the extruder.

However, US2003/0075821 A1 does not allow a quality control of the polymer melt, in particular if desiccant-filled polymers are used.

It is therefore one object of the present invention to provide a method and apparatus for compounding and injection-moulding which allows an easy and effective quality control when desiccant-filled polymers are used.

It is another object of the present invention to provide the use of suitable elements and process steps in the compounding and injection-moulding of desiccant-filled polymers in order to allow an easy to handle and effective on-line or in-line quality control.

According to a first aspect of the invention, it was surprisingly found that provision of a conventional injection-moulding compounder (IMC) with a sensor element which allows determination of the viscosity or melt-flow index of the polymer melt provides surprising advantages and resolves the problems associated with the prior art.

According to the invention, any conventional machines as known in the art for compounding and injection-moulding may be used. Suitable machines are commonly known as so called injection-moulding compounder (IMC) machines. A description of a suitable machine may for example be found in the aforementioned US2003/0075821 A1 the respective disclosure of which is explicitly incorporated herein by reference. Thus, in general, such machines are provided with a continuously operating extruder which is charged with initial plastic material, e.g., plastic granulate, to produce a plastic melt. The extruder may be configured in many different ways, e.g., as single screw extruder or twin screw extruder with screws rotating in a same direction or in opposite directions. Preferred configurations involve the provision of one or more feed openings for mixing several materials.

During continuous operation of the extruder screws, melt is provided constantly at the extruder outlet for transfer to an injection chamber of an injection device for subsequent introduction to an injection mould by means of a reciprocating plunger.

Compounder-type injection moulding machines allow the mixing of several materials. In the present invention, they are used for compounding at least one desiccant with at least one polymer in order to obtain the desiccant-filled polymer to be injection moulded.

One type of machines involves the provision of a reservoir to form an intermediate storage for receiving melt delivered by the extruder while the injection phase of the injection device is carried out. As the injection device is filled again during the filling phase, the reservoir is emptied while the extruder continues to operate. Another approach involves the provision of several injection devices, which are alternatingly filled with melt.

According to a preferred embodiment, an IMC-type machine is used as described in US2003/0075821 A1, namely an injection moulding machine includes an extruder for continuously producing a melt, at least one injection device fluidly connected with the extruder by a first conduit to receive melt and including an injection ram movable to a forward position, in which melt is injected into an injection mould, and a rear position, in which melt is introduced into the injection device, a pressure sensor, disposed in the extruder or in an area between the extruder and the injection device, for ascertaining a melt pressure downstream of an outlet of the extruder and outputting a signal commensurate with the ascertained melt pressure, a control unit receiving the signal from the pressure sensor; and a drive operated by the control unit for actively moving the injection ram backwards in response to the signal according to a predetermined algorithm.

Also referring to US 2003/0075821 A1, an injection moulding machine may be used which includes an extruder for continuously producing a melt, at least one injection device fluidly connected with the extruder by a first conduit to receive melt and intermittently injecting melt into an injection mould, a reservoir, fluidly connected to the extruder as well as to the injection device, for temporary storage of melt, a pressure sensor, disposed in the extruder or in an area between the extruder and the reservoir, for ascertaining a melt pressure downstream of an outlet of the extruder and outputting a signal commensurate with the ascertained melt pressure, a control unit receiving the signal from the sensor; and a regulating device, received in the reservoir and having a drive mechanism, for adjusting a fill degree in the reservoir by expelling melt and/or introducing melt into the reservoir to a predetermined level, wherein the drive mechanism is controlled by the control unit in response to the signal in accordance with a predetermined algorithm. Suitably, the drive mechanism includes a plunger which is moved back and forth within the reservoir to thereby adjust the volume of the reservoir.

It has now been surprisingly found that monitoring of the viscosity or melt flow index (MFI) of the desiccant-filled polymer to be injection moulded allows an easy and effective quality control means. Thus, it was found that the melt flow index or viscosity of the polymer melt is a reliable measure for the efficiency of the desiccant in the polymer. Thus, the MFI is dependent on the loading rate and the distribution of the desiccant in the polymer matrix, and in fact allows convenient monitoring of the effectiveness of the desiccant in the polymer composition.

According to one aspect of the invention, an injection moulding machine comprises:

an extruder for continuously producing a melt of a desiccant-filled polymer;

at least one injection device fluidly connected with the extruder by a first conduit to receive melt and including an injection ram movable to a forward position for injection of melt into an injection mould and a rear position for introduction of melt into the injection device, characterized in that the injection moulding machine further comprises a sensor which allows determination of the viscosity or melt flow index of the desiccant-filled polymer melt.

According to the present invention, desiccant-filled polymers are used, i.e. the polymer compositions comprise at least one desiccant and at least one polymer component.

According to a preferred embodiment, the injection moulding machine thus comprises means for providing and mixing at least one desiccant and at least one polymer.

According to a further preferred embodiment of the invention, the machine comprises a reservoir filled with a desiccant-containing component and a reservoir filled with a polymer component. The components can then be mixed in the extruder or in separate means prior to the extruder.

According to a further preferred embodiment of the invention, the machine comprises a dosing unit for the desiccant and/or the polymer.

According to a further preferred embodiment of the invention, the machine comprises a compounding unit for the desiccant and the polymer.

According to a further preferred embodiment of the invention, the machine has means to regulate or adjust the pressure of the melt to a desired value. As an example, the means as described in US2003/0075821 A1 may be used; the respective disclosure in US2003/0075821 A1 is incorporated herein by reference.

According to a further preferred embodiment of the invention, the machine has means to regulate or adjust the temperature of the melt to a desired value. Such means are known to the skilled person and make use of conventional temperature sensing and controlling means.

According to a particularly preferred embodiment, the temperature and the pressure of the melt are kept constant in the apparatus and method of the invention.

According to a particularly preferred embodiment, the temperature and the viscosity or MFI of the melt are kept constant in the apparatus and method of the invention.

As used herein, the term "desiccant" shall also encompass any absorbent or adsorbent which is capable of absorbing or adsorbing water in liquid form or in the form of moisture (water vapor), or otherwise capable of removing water or moisture from the surrounding atmosphere. Non-limiting examples of suitable desiccants include silica gel, zeolites, desiccant clays, molecular sieves, activated carbon, earth alkali oxides and the like, and combinations thereof. Despite of the different mechanisms of sorption, the terms absorbent and adsorbent shall be used interchangeably.

According to a preferred embodiment of the invention, the percentage of desiccant in the polymer composition is above 15 wt.-%, more preferred above 15 wt.-%, more preferred above 25 wt.-%, more preferred above 35 wt.-%, more preferred above 40 wt.-%, more preferred above 45 wt.-%, more preferred above 50 wt.-%, based on the total weight of the desiccant-filled polymer composition.

Any polymer component as known in the art may be used, depending on the intended properties of the product. Non-limiting examples of suitable thermoplastic materials, i.e. polymeric materials exhibiting thermoplastic properties are given below. While the thermoplastic material can be comprised of a polymer of a single monomer; a copolymer of two or more monomers, a mixture of two or more polymers from single monomers, mixtures of two or more copolymers, or mixtures of one or more polymers from a single monomer and one or more copolymers, in a preferred embodiment, the thermoplastic material comprises a mixture of two or more copolymers or a mixture of at least one polymer from a single monomer and at least one copolymer. As a non-limiting example the thermoplastic material may be prepared from a blend of linear low density polyethylene (LLDPE), low density polyethylene (LDPE) and an ethylene vinyl acetate (EVA) copolymer, wherein each of the components include an ethylene unit.

Non-limiting examples of polymers from single monomers include: polystyrenes; polyolefins (polyethylene, polypropylene); polyacrylates, polymethacrylates: polyamides, polyimides, polyesters, polybutylene terephthalate, polycarbonates, polyethersulfones, and polyvinyl chloride. Non-limiting examples of copolymers include: styrene-butadiene rubbers (SBR); styrene-ethylene-butadiene-styrene copolymers (SEBS); butyl rubbers; ethylene-propylene rubbers (EPR); ethylene-propylene-diene monomer rubbers (EPDM); ethylene-vinyl acetate copolymers (EVA); ethylene-acrylate or butadiene-acrylonitrile; maleic anhydride modified polymers and copolymers; polyether-polyamide copolymers; and grafted copolymers.

Any conventional sensor can be used to determine the viscosity or melt flow index (MFI) of the desiccant-filled polymer. In particular, a rheometer or another suitable sensor element may be used, which allows determination/calculation of the viscosity or the MFI, respectively.

The sensor element may be arranged at any position downstream of the outlet of the extruder in order to allow determination of the viscosity or MFI in the desiccant-filled polymer composition to be injection moulded. As an example, the sensor element can be arranged directly at the extruder outlet, or at a certain distance therefrom, towards the injection nozzle. Such a sensor may be provided for "on-line" measurement of the viscosity or MFI, e.g. using a conventional capillary measurement device.

In an alternative embodiment, the sensor element may be included in a so called instrumented nozzle as known in the field. In this embodiment, the sensor element is directly included in the injection nozzle and allows determination of the viscosity or MFI of the desiccant-filled polymer melt as it is then injected in the mould, in particular by determining the viscosity of the melt by measuring the pressure drop in the nozzle. This is an example for an "in-line" system.

According to a further preferred embodiment, the "on-line" and the "in-line" system as described above may also be both present in the IMC machine. Such a coupling allows to provide improved retroaction on the dosing of the desiccant.

Another aspect of the present invention concerns a method of operating an injection moulding machine having an extruder, comprising the steps of:

Ascertaining a viscosity or melt flow index downstream of an outlet of the extruder;

Comparing the viscosity or melt flow index with a given desired viscosity or melt flow index;

Generating a control signal in response to a deviation between the ascertained viscosity or melt flow index and the desired viscosity or melt flow index; and Activating a drive mechanism for adjusting in response to the control signal the desiccant load in the polymer to adjust the viscosity or melt flow index to a level corresponding with the desired viscosity or melt flow index value.

According to a further aspect of the invention, a method of operating an injection moulding machine having an extruder, includes the steps of determining the viscosity or melt flow index of a desiccant-filled polymer melt downstream of an outlet of the extruder; comparing the viscosity or MFI with a given desired viscosity or MFI; generating a control signal in response to a deviation between the ascertained viscosity or MFI and the desired viscosity or MFI; and activating a control or drive mechanism, preferably at the compounder or dosing unit for the desiccant in response to the control signal to adjust the amount of desiccant in the polymer, so that the viscosity or MFI corresponds again to the desired level. A corresponding algorithm can be routinely established by the skilled person.

In other words, a controlled variable is ascertained in response to a deviation between the actually measured viscosity or MFI of the melt and a desired value, and used as input variable of the respective control or drive means to maintain the desired viscosity or MFI level in or downstream of the extruder. As an example, if the determined viscosity or MFI as measured by the sensor element described herein is lower than the desired value, the compounding step (in particular the dosing of the desiccant and/or polymer) is adjusted such that the amount of desiccant is increased in the polymer, so that the desired viscosity or MFI is reached again. If, on the other hand, the determined viscosity or MFI as measured by the sensor element described herein is higher than the desired value, the compounding step (in particular the dosing of the desiccant and/or polymer) is adjusted such that the amount of desiccant is decreased in the polymer, so that the desired viscosity or MFI is reached again.

The above method of operation allows an easy and fast on-line or in-line control of the quality of the desiccant-filled polymer and an immediate correction of undesired variations without the necessity of interrupting the production and to change the desiccant-filled polymer composition.

Also, it allows easy recording of the loading rate of desiccant in the polymer and the quality of the desiccant-filled polymer for each produced (moulded) part.

The possibility for immediate correction also obviates the necessity to put product batches into quarantine.

A further aspect of the present invention concerns the use of a sensor which allows determination of the viscosity or melt flow index of a desiccant-filled polymer melt in an injection moulding machine comprising means for providing and mixing at least one desiccant and at least one polymer; at least one extruder for continuously producing a melt; and at least one injection device fluidly connected with the extruder by a first conduit to receive melt and including an injection ram movable to a forward position for injection of melt into an injection mould and a rear position for introduction of melt into the injection device.

As a non-limiting example for carrying out the invention, it may be referred to the compounder-type injection moulding machine as described in FIG. 1 and the corresponding parts of the specification of US2003/0075821 A1, with the addition of e.g. a conventional capillary measurement device (rheometer) next to the pressure sensor 70, and connected to a controlling unit and a control or drive mechanism which allows adjustment of the dosing of the desiccant to the polymer in response to the signal from the viscosity or MFI sensor. Conventional reservoirs as well as dosing, mixing and compounding units for the desiccant and the polymer are used in the injection moulding machine according to this example.

The invention claimed is:

1. A method of operating an injection moulding machine having an extruder for continuously producing a melt of a desiccant-filled polymer and with at least one injection device fluidly connected with the extruder and including an injection ram, comprising the steps of;
   Ascertaining a viscosity or melt flow index downstream of an outlet of the extruder by a sensor which allows determination of viscosity or melt flow index;
   Comparing the viscosity or melt flow index with a given desired viscosity or melt flow index;
   Generating a control signal in response to a deviation between the ascertained viscosity or melt flow index and the desired viscosity or melt flow index; and
   adjusting in response to the control signal the desiccant load in the polymer to adjust the viscosity or melt flow index to a level corresponding with the desired viscosity or melt flow index value.

2. Method according to claim 1, wherein the percentage of desiccant load in the overall polymer composition is above 15 wt.-%, based on the total weight of the desiccant-filled polymer composition.

3. Method according to claim 1, wherein the percentage of desiccant load in the overall polymer composition is above 25 wt.-%, based on the total weight of the desiccant-filled polymer composition.

4. Method according to claim 1, wherein the percentage of desiccant load in the overall polymer composition is above 35 wt.-%, based on the total weight of the desiccant-filled polymer composition.

5. Method according to claim 1, wherein the percentage of desiccant load in the overall polymer composition is above 45 wt.-%, based on the total weight of the desiccant-filled polymer composition.

6. Method according to claim 1, wherein the percentage of desiccant load in the overall polymer composition is above 50 wt.-%, based on the total weight of the desiccant-filled polymer composition.

7. An injection moulding machine, comprising:
   an extruder for continuously producing a melt of a desiccant-filled polymer;
   at least one injection device fluidly connected with the extruder by a first conduit to receive melt and including an injection ram movable to a forward position for injection of melt into an injection mould and a rear position for introduction of melt into the injection device,
   mechanism for providing and mixing at least one desiccant and at least one polymer,
   mechanism to regulate or adjust the pressure of the melt to a desired value, and mechanism to regulate or adjust the temperature of the melt to a desired value,
   characterized in that the injection moulding machine further comprises a sensor which allows determination of the viscosity or melt flow index of the desiccant-filled polymer melt, the sensor being a pressure sensor, disposed in a location selected from the group consisting of inside the extruder, downstream of the extruder, and an area between the extruder and the injection device, for ascertaining a melt pressure state downstream of an outlet of the extruder and outputting a signal commensurate with the melt pressure state,
   a control unit receiving a signal from the sensor, and
   a control or drive mechanism operated by the control unit for changing the desiccant load in the polymer according to a predetermined algorithm.

8. The injection moulding machine of claim 1, wherein the sensor is arranged downstream of the extruder.

9. The injection moulding machine of claim 1, wherein the sensor is included in an instrumented injection nozzle.

10. The injection moulding machine of claim 1, wherein the control or drive mechanism is positioned at a compounding unit or dosing unit in order to influence the mixing ratio of polymer and desiccant.

11. The injection moulding machine of claim 1, further comprising
   a control unit receiving the signal from the pressure sensor; and
   a drive mechanism operated by the control unit for actively moving the injection ram backwards in response to the signal according to a predetermined algorithm.

* * * * *